United States Patent [19]
Dupuy et al.

[11] Patent Number: 5,546,384
[45] Date of Patent: Aug. 13, 1996

[54] STEP BY STEP METHOD OF CONTROLLING FREQUENCY REDEFINITION IN A CELLULAR MOBILE RADIO SYSTEM

[75] Inventors: Pierre Dupuy; Anne Freulon, both of Paris, France

[73] Assignee: Alcatel Mobile Communications, Paris, France

[21] Appl. No.: 257,054

[22] Filed: Jun. 8, 1994

[30] Foreign Application Priority Data

Jun. 9, 1993 [FR] France ................................. 93 06938

[51] Int. Cl.⁶ .................................................. H04J 4/00
[52] U.S. Cl. ........................... 370/50; 370/69.1; 370/95.1
[58] Field of Search ........................... 370/50, 69.1, 121, 370/95.1, 95.3

[56] References Cited

U.S. PATENT DOCUMENTS

| | | | |
|---|---|---|---|
| 5,142,534 | 8/1992 | Simpson et al. | 370/50 X |
| 5,204,856 | 4/1993 | Bebee et al. | |
| 5,301,188 | 4/1994 | Kotzin et al. | 370/50 |
| 5,311,504 | 5/1994 | Colamonico et al. | 370/50 |

FOREIGN PATENT DOCUMENTS

| | | |
|---|---|---|
| WO92/06546 | 4/1992 | WIPO . |
| WO93/20628 | 10/1993 | WIPO ..................................... 370/50 |

OTHER PUBLICATIONS

M. Yabusaki, "Channel Reassignment Alogorithm in Mulitple Carrier Hopping TDMA System", *IEEE Transactions On Communications*, vol. 41, No. 2, Feb. 1993, pp. 381–390.
French Search Report FR 9306938, 28 Feb. 1994.

*Primary Examiner*—Melvin Marcelo
*Attorney, Agent, or Firm*—Sughrue, Mion, Zinn, Macpeak & Seas

[57] ABSTRACT

In a reliable step by step method of controlling frequency redefinition in a cellular mobile radio system with no severe constraints on the network or on the mobile and using only existing procedures between mobiles and the network, frequency redefinition is effected time slot by time slot by freeing each time slot step by step by first eliminating any calls in said time slot, then effecting frequency redefinition of said freed time slot by assigning it the new list of frequencies, and finally making said time slot available for traffic again.

12 Claims, 5 Drawing Sheets

STEP BY STEP METHOD OF CONTROLLING FREQUENCY REDEFINITION IN A CELLULAR MOBILE RADIO SYSTEM

BACKGROUND OF THE INVENTION

1. Field of the Invention

The field of the invention is that of mobile radio systems, in particular GSM mobile radio systems.

2. Description of the Prior Art

In GSM systems mobiles move around in a network of adjoining cells. Each cell has a separate base transceiver station. Communications involving a mobile in a given cell pass through the base transceiver station of that cell.

Call set-up procedures are governed by a specific protocol with which the present invention is not concerned. When call set-up is completed a specific bidirectional traffic channel (TCH) is assigned to each mobile. The same traffic channel is time-division multiplexed for use by a plurality of mobiles (usually eight at this time). According to the current GSM standard a traffic channel is defined by a list of frequencies. An algorithm controlling hopping between the frequencies in this list can make transmission relatively insensitive to fading.

Allocation of the channels, and consequently of the list of frequencies, in the various cells of the network is managed by a central module of the network. The allocation of frequencies in the network, and where applicable the frequency hopping rules, are organized in such a way as to avoid intracell and intercell interference.

Each traffic channel is allocated a given list of frequencies in a manner that in theory is relatively stable. However, the central module of the network may require to redefine the channel frequencies. This may be to alleviate loss of a carrier, to remove risks of interference caused by expansion of the network, etc.

The conditions under which the channel frequencies are redefined are by no means immaterial. Problems can arise with the continuity of the calls in progress, in two situations in particular:

if a mobile is in the process of changing channel within the same cell around the time the frequencies of the source channel and/or the target channel are redefined; to use the GSM terminology, this can represent either an "immediate assignment" (changing from a broadcast channel to a dedicated channel) or a "normal assignment" (transfer between two dedicated channels); this is described in more detail below;

if a mobile is in the process of changing cell ("handover") around the time the frequencies of the origin and/or target channel are redefined.

The problem also arises of the behavior of a mobile station if this cannot carry out the redefinition of its traffic channel frequencies. This can happen in the event of a protocol error, if the mobile cannot read or interpret the signalling messages relating to the required frequency redefinition.

Various solutions have been proposed to these various problems.

The solution to loss of communication with a mobile because the mobile is unable to execute the frequency redefinition message currently adopted is for the mobile to ignore the lost message. Consequently, the mobile continues to transmit on the old frequencies, until loss of communication is detected. The drawback of this is that during the time which elapses before transmission by the mobile is interrupted this transmission is a potential source of interference.

Two solutions have been proposed for the problem of virtually simultaneous frequency redefinition and channel or cell changing.

A first solution, recommended in standard 04.08.V3.13.0, entails systematically delaying the channel or cell change so that it coincides with frequency redefinition. Assuming a cell change, there will therefore be alignment to the time of frequency redefinition in the target cell. Thus, with this solution, the channel or cell change is effected with the new frequencies.

This first solution has various drawbacks, including some doubt as to what constitutes an acceptable time-delay. If the time-delay is too long there may be significant long-term deterioration of the link, especially in the case of a cell change. This risk is by no means negligible, all the more so in that the GSM system provides a kind of hysteresis to prevent unnecessary switching between cells in the case of a mobile moving along an intercell boundary. The cell change is not effected until the mobile has clearly and finally left the old cell, and is achieved at the cost of some slight and temporary deterioration of communication quality during the time taken to verify that exit from the cell is durable; the proposed switching time-delay would accentuate this deterioration.

In theory it would be possible to impose a maximum time-delay to reduce the risk of call quality deterioration, especially if the network imposes a maximal time-delay between announcement of frequency redefinition and its execution. Apart from the penalty that this represents for the network, this maximal time-delay also has the drawback that it cannot be significantly reduced as it is necessary to retain sufficient time to start up carriers, perform synchronization, etc.

A second solution, currently under assessment, offers better flexibility but is more complex.

The basic principle of this second solution is to have the mobile manage four lists of frequencies simultaneously, namely the old and new frequency definitions for the origin channel and those for the target channel (whether the target channel is in the same cell (assignment) or in a new cell (handover)). On changing cell this principle enables the mobile to revert to the old cell if it does not "lock on" in the new cell. However, this increases commensurately the memory capacity requirement, the on-board processing capacity requirement and the size of the signalling messages to be exchanged.

A third solution described in French patent application No. 93.02308 (now French Patent No. 2,702,109) proposes a middle path between the first solution, which is somewhat unreliable, and the second solution, which is complex to implement both in the mobile and in the network. It involves telling the mobile, at the time of the cell change command, the time at which a frequency change is scheduled in the destination cell. The mobile, knowing also the time in the new cell, the time in the current cell and (where applicable) the time at which a frequency change is scheduled in the current cell, can determine the time remaining for it to complete its transfer into the new cell or to return to its current cell if the attempt to change cell should fail. If this time is greater than the time remaining before the frequency change in one of the two cells, it refuses to carry out the intercell transfer (handover) and advises the network of this, so that it can try again later.

Although this method appears to be a good compromise between the previous two solutions, all these methods have the same drawback: virtually all of the complexity is required in the mobile since the network does not have an accurate knowledge of the time throughout the network of cells. These methods also impose a severe constraint in respect of synchronizing frequency change in the network: the frequency redefinition must be carried out at exactly the same time in a cell, in the infrastructure equipment and in the mobile.

An object of the invention is to alleviate the drawbacks of the existing solutions by providing a method that is reliable, imposes no severe constraints on the network or on the mobile and relies entirely on existing procedures between mobiles and the network, so guaranteeing freedom from compatibility problems which are always likely to be encountered when introducing new methods that can interact with existing methods.

SUMMARY OF THE INVENTION

This objective, and others that emerge below, are achieved in accordance with the invention by a frequency redefinition method for a cellular mobile radio system with mobiles moving in a geographical network of cells, in which communication with a mobile is established on an available communication channel in the cell in which said mobile is located, a communication channel being a dedicated channel such as a GSM TCH channel, for example, calls being conveyed in a time-division multiplex whose successive frames are formed of time slots each containing at least one communication channel, each call being routed in segments in the same time slot on a plurality of multiplex frames, each communication channel being further defined by a list of frequencies usable for said communication, said list of frequencies being redefinable, under the control of a mobile radio network management module, in order to replace a first list of N frequencies with a second list of M frequencies (M can be equal to or different from N), the method of the invention being characterized in that replacement of the first list of frequencies by the second is effected time slot by time slot, freeing each time slot step by step by eliminating all calls in said time slot, followed by the frequency redefinition of said freed time slot by assigning it said second list of M frequencies, and finally making said time slot available again for traffic.

In this way, in accordance with the invention, once at least one of the time slots has been completely freed it can be returned to traffic with the new frequency definition without any problems vis à vis the mobiles since at this time no mobile is using any dedicated channel on this time slot. Note here one advantage of the invention as compared with the prior art: the frequency change in the infrastructure does not need to be carried out at an extremely precise time. Delay in acting on the frequency change request will impact on the total duration of the procedure but not on its successful outcome.

The repetition of these time slot freeing phases followed by frequency redefinition of the freed time slot followed by its return to service with the new frequency definition enables frequency redefinition of all channels step by step without it ever being necessary to know the frequency changes in adjoining cells or to advise the latter of the current frequency change.

The procedure of freeing all the dedicated channels of a time slot can be any of the methods known to the person skilled in the art. For example, moving mobiles to other free communication channels of the same cell (in GSM systems, by a "normal assignment" procedure), moving all mobiles into another cell by intercell transfer (in GSM terminology, handover) procedures, interrupting calls, barring setting up of new calls on one or more time slots to be freed, etc; an alternative is to wait for the time slot to be freed by natural interruption of calls.

In an advantageous embodiment of the invention the freeing of each time slot entails waiting a predetermined time for natural freeing of at least one time slot and, failing any such natural freeing during said predetermined time, effecting forced freeing by intracellular or intercellular transfer or by forced call interruption, for example.

The first time slot to be freed is advantageously that which is freed naturally before the others. Nevertheless, if the frequency redefinition concerns a frame including a specific time slot including a communication channel using a control frequency which is not affected by the frequency redefinition, the first time slot to be freed is preferably said specific time slot.

This applies in particular to time slots including a BCCH channel in a TCH type frame. This type of channel is conveyed at a specific frequency (with no frequency hopping), which is modified only much more rarely, and always independently of the other frequencies used for the frame.

Note that if the control frequency is not changed there are fewer dedicated channels to move on this specific time slot than on the others: it would therefore always be beneficial to free this specific time slot first in cases where the number of channels to be moved is greater than the number of free channels.

If the control frequency has to be changed, this specific time slot must no longer be regarded as a special case.

In accordance with the invention, if the second list of frequencies comprises at least as many frequencies as the first, replacement of the first list of frequencies by the second is carried out time slot by time slot, preferably using the following process:

at least a first time slot is freed by eliminating all calls in said time slot;

frequency redefinition of said first time slot freed is effected by assigning it said second list of M frequencies, after which said time slot is made available for traffic again;

a second time slot is freed by transferring calls from said second time slot to said first time slot;

frequency definition of said second time slot freed is effected by assigning it said second list of M frequencies, after which said second time slot is again made available for traffic;

the transfer of calls from time slot to time slot is continued iteratively until frequency redefinition has been effected for all the time slots of the communication channel.

As a variant of this method, it is also possible (in the case of adding frequencies to a cell) to free one or more time slots by moving mobiles at least temporarily to the new frequencies by conventional "normal assignment" methods (GSM transfer between two dedicated channels). The benefit of this variant is that it avoids waiting or forcible freeing of a time slot if all the communication channels are busy at the time of the change, since the new communication channels are created before the existing channels have to be freed. These advantages are obtained at the following cost: this variant requires the mobiles to be moved twice, once to move them to the additional frequency and again to carry out the full frequency redefinition. However, in the absence of frequency hopping the second movement is no utility as the mobiles then use only one frequency, regardless of the number of frequencies that can be used in the cell.

The method described above obviously applies to the situation in which the frequency redefinition leads to the removal of one or more frequencies. At the risk of stating the obvious, the operation cannot be conducted without interrupting calls or moving a mobile from one cell to another unless the new frequency definition does not reduce the traffic capacity of the cell below the number of mobiles communicating in the cell prior to the frequency change.

The method described above also applies to the situation in which the frequency redefinition changes one or more frequencies without changing the traffic capacity of the cell.

There are then two cases to be considered, depending on how the frequency can be changed.

In the first case the frequency can be changed independently in all the time slots. It is then sufficient to use the process already described, allowing for the fact that the traffic capacity of the cell is not increased: it is necessary either to wait for calls to finish or to forcibly cut off calls it is not possible to free a complete time slot by means of normal assignment or handover to other cells. This latter eventuality must be seen as extremely rare, however, if a wait of a few seconds is acceptable for calls to terminate naturally, the mean duration of a mobile radio call being in the order of one minute.

In the second case the frequency change can only be effected simultaneously in all the time slots, the frequency change requiring a finite time. This is the case when the network comprises fixed frequency transmitters or when the frequency changing means require a substantial reconfiguration time (mechanically adjusted cavities). In this case the invention is advantageously applied twice. It is used the first time to remove the frequency which is to be eliminated. If this frequency is being used by a single call, the invention therefore provides for natural or forced clearing down of this specific call. If the frequency is being used in a frequency hopping process, this must be able to continue temporarily with one fewer frequency available; this means that it will be necessary to free (temporarily) at least one communication channel. Once this has been done the frequency is changed in the cell. When this change has been done the invention is applied again in order to use this new frequency in all time slots.

Another important factor to be taken into consideration is how the system behaves when intercellular transfer (handover) is necessary or desirable between the start and end of the process. Two cases have to be considered, depending on whether the mobile must leave or rejoin the cell in which the frequency change is being implemented.

When a mobile has to leave the cell to go to another cell it is sufficient to wait for the channel busied by this mobile to be completely free, at the time when handover to the other cell is completed successfully (i.e. until reception of the GSM signal "HANDOVER COMPLETE").

If a mobile has to enter the cell in which a frequency change is in progress, there are again two cases to be taken into consideration.

In the first case the arrival of the mobile does not compromise complete freeing of a time slot: accepting this mobile is then no problem, and the mobile will be treated as a normal mobile if the transfer is successful. If the transfer fails the channel is freed when the mobile reverts to its old cell. Note that there is nevertheless some benefit in allocating this mobile a channel corresponding to the new list of frequencies to avoid the need for intracellular transfer ("normal assignment") in the new cell shortly afterwards.

In the second case the arrival of a mobile is not compatible with the current time slot redefinition procedure: these handovers cannot be accepted. This occurs, for example, when the frequency redefinition reduces or temporarily reduces capacity, with a ban on any assignment of a new call in the time slots for which redefinition is in progress.

Another case to be considered is that of a mobile accessing for the first time the cell in which frequency redefinition is in progress. Under the GSM standard, the call set-up procedure is effected by transferring ("immediate assignment") the exchange of signalling information from a broadcast channel to a dedicated channel, typically a traffic channel TCH or, better still, a lower traffic consumption SDCCH channel. Each of these two types of dedicated channel can undergo frequency redefinition. To optimize the process:

all new transfers are effected directly to a channel associated with the new list of frequencies;

all calls set up at the time of frequency redefinition are progressively transferred to a channel associated with the new list of frequencies;

for all transfers in progress, i.e. for which an "immediate assignment" has been initiated but not completed, it is necessary to allow for the fact that, on the first access, the mobile takes some time to complete the access procedure: it is then necessary to allocate the channels of the new time slot as soon as it is redefined but to avoid reconfiguring the old time slot until it is certain that the mobile has obtained access after the "immediate assignment" (reception of the GSM signal "ASSIGNMENT COMPLETE"), or that the transfer has been aborted.

In this instance, the maximum waiting time the system must provide before freeing an SDCCH channel is set by the GSM procedure (as for a "handover", incidentally), as in the GSM system a transfer request which has had no effect after a predetermined time is automatically and immediately aborted.

In all cases the method employed guarantees that the number of SDCCH channels is never reduced during the frequency change because the SDCCH channels are recreated with the new frequency law before they are used.

To summarize, if frequency redefinition occurs when a transfer of the group comprising transfers to another cell and first access requests (affecting a channel for which the frequencies are to be redefined) is in progress, the respective channel associated with the old list of frequencies to be replaced is not regarded as free until successful transfer is confirmed, i.e. advantageously subject to a predetermined time-delay.

If a transfer from the group comprising transfers of a mobile from another cell and first access requests occurs at the time of frequency redefinition the call is preferably established again on a time slot already associated with the new frequency definition.

Other features and advantages of the invention emerge from the following description of one embodiment of the invention given by way of non-limiting example and the appended drawings.

DETAILED DESCRIPTION OF THE PREFERRED EMBODIMENTS

Figure 1:
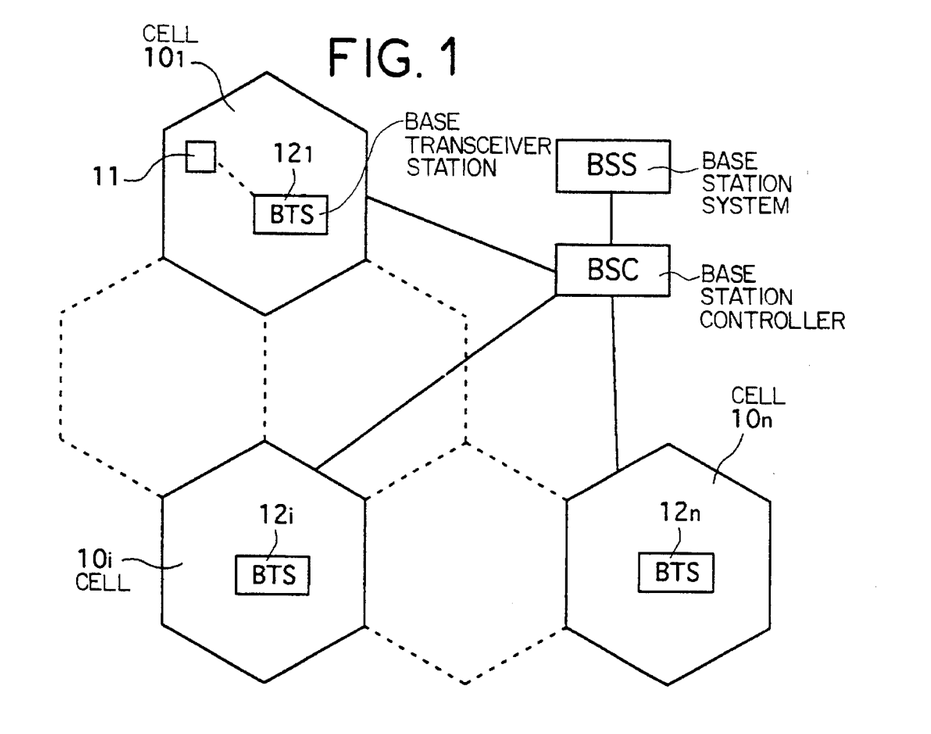
FIG. 1 is a diagram showing a GSM type cellular mobile radio network in which the method of the invention can be used.

Referring to FIG. 1, a cellular mobile radio network comprises a plurality of preferably adjacent cells $10_1$, $10_i$, $10_n$ covering a geographical area in which mobiles 11 can move. In the example described below the network is a GSM type network.

The mobiles 11 in each cell $10_i$ set up calls to a base transceiver station (BTS) $12_i$ for the respective cell $10_i$. In a GSM type network (see, for example, M. MOULY and M. B. PAUTET ISBN 2-9507190-0-7 "The GSM System for Mobile Communications", and the GSM specifications), the base transceiver stations BTS are under the control of a base station controller (BSC) in turn controlled by a central network control module or BSS (base station system).

Calls set up between a base transceiver station $12_i$ and a mobile 11 in the respective cell $10_i$ can use various channels, including:

a bidirectional traffic channel (TCH) carrying user information in the form of speech or data signals, signalling channels such as a slow associated control channel (SACCH) or broadcast control channel (BCCH).

The system uses the BCCH channel to send a mobile signalling information when said mobile is on standby. The signalling information is conveyed to the mobile via the SACCH channel when the mobile is in connected mode. The signalling information comprises instructions or parameters concerning operation of the network, for example.

The SACCH channel is interlaced with and therefore, so to speak, integrated into the traffic channel TCH.

Calls can also use an SDCCH channel (standalone dedicated control channel). This type of channel comprises a multiframe independent of the TCH channels and in the form of a two-level time-division multiplex (each time slot can carry different calls, depending on the frame of which it is part), associated where necessary with a list of usable frequencies (with or without frequency hopping).

The GSM specifications provide other channels which are not mentioned here. The person skilled in the art can use one or more of the other channels, if desired, to convey some of the signals needed to implement the method of the invention rather than the above channels.

Figure 2:
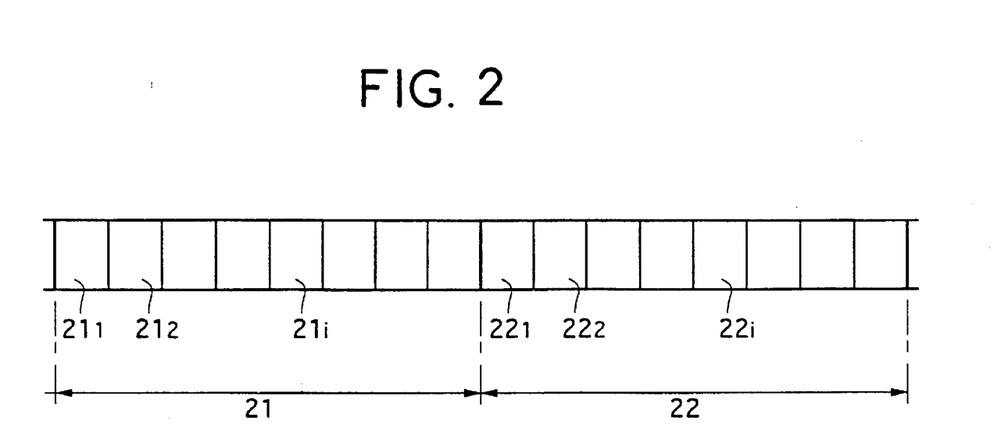
FIG. 2 shows the structure of a typical frame conveying time-division multiplexed bidirectional traffic channels (TCH).

Referring to FIG. 2, bidirectional calls are conveyed in a time-division multiplex whose successive frames 21, 22 are made up of time slots $21_1$, $21_2$, . . . , $22_1$, $22_2$, . . . each containing at least one communication channel.

Consequently, each call is conveyed by segments within a time slot of the same rank $21i$, $22i$, . . . on a plurality of frames 21, 22 of the multiplex.

More than one call can be carried in the same time slot if more than one frequency can be used (i.e. appear in the "list of frequencies" associated with the time slot and/or the frame): each call can be conveyed on a separate frequency, or (and preferably) each call can use a plurality of frequencies (this is the frequency hopping technique), using all or some of the usable frequencies so that the same frequency is used for only one call at a time in the time slot.

The frequency redefinition procedure of the invention entails modifying the list of frequencies, replacing all or some of the N original frequencies with M new frequencies. All the following situations are feasible: N>M, N<M, N=M, all the frequencies or some only of them being replaced.

Figure 3A:
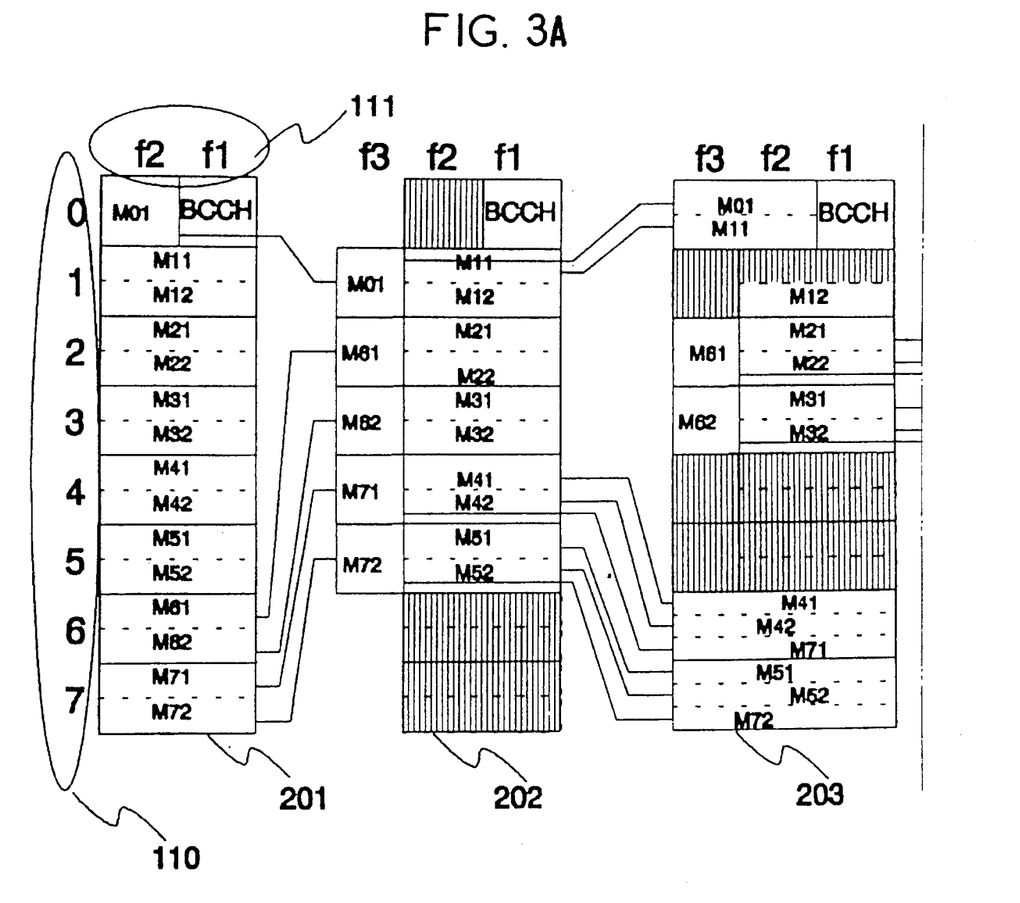
FIGS. 3A and 3B show a first method of carrying out frequency redefinition in accordance with the invention.
Figure 3B:
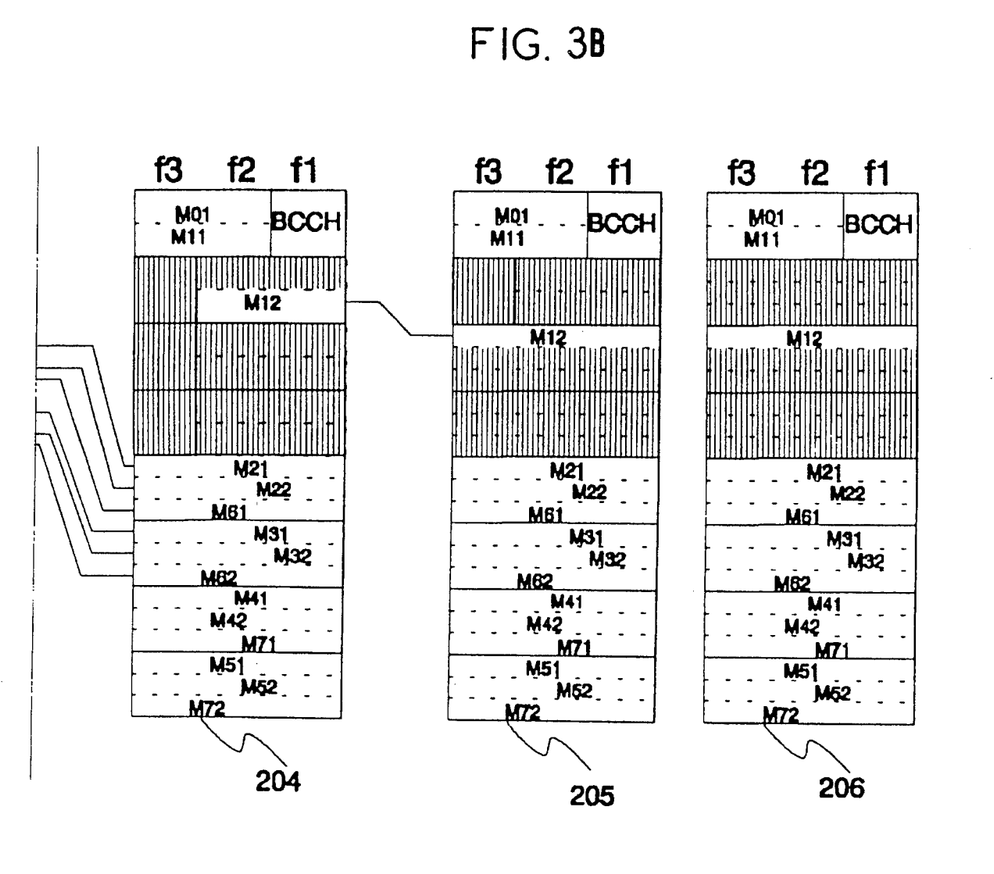

To illustrate the method of implementing the invention, FIG. 3 shows a first method of implementing frequency redefinition in accordance with the invention, used in a simplified frame configuration.

Examination of the allocation table 101 before starting the procedure indicates that:

the cell is using a set (111) of two frequencies f1 and f2;

the mobiles M01, M11, M12, M21, . . . , M72 are distributed as shown between the eight time slots (110) numbered 0 to 7.

Each time slot except time slot 0 can handle two mobiles on two communication channels. The various communication channels of the same time slot are distinguished by the fact that they use the same frequencies at different times. In the FIG. 1 example there remain two inactive channels on time slots 2 and 4.

In time slot 0 the frequency f1 is reserved for the BCCH ("specific" time slot). There can therefore be only one mobile M01 on the remaining single frequency.

Frequency redefinition entails, for example, adding a frequency f3 to the set of frequencies (111) of the cell.

The following method is used for this:

Firstly, a time slot is freed. To this end, the mobile M42 is moved from time slot 4 to time slot 2 by an assignment procedure. This method is faster than handover (intercellular transfer) and is preferable to the latter if the mobile has to change channel without changing cell. At the end of the assignment procedure time slot 4 is entirely freed and the arrangement 102 results.

Time slot 4 being free, it is now possible to assign it the three frequencies f1, f2 and f3 without disturbing any calls in progress.

The time slot freeing procedure is then repeated, by moving three mobiles to time slot 4. In the FIG. 1 example the mobiles M51 and M52 of time slot 5 and the mobile M01 of time slot 0 are moved to time slot 4 by means of an assignment procedure.

On completion of the assignment procedure time slot 5 is entirely free, time slot 0 conveys only the BCCH channel and the arrangement 103 is obtained.

Time slot 5 being free, it is now possible to assign it the three frequencies f1, f2 and f3 without disturbing any calls in progress.

Time slot 0 being free except for the BCCH, it is now possible to assign it the two frequencies f2 and f3 without disturbing any calls in progress.

The time slot freeing procedure is then repeated as above. On completion of the procedure the arrangement 104 is obtained in which time slots 1 and 6 are entirely free: their sets of frequencies are changed as previously.

A further time slot freeing procedure leads to the arrangement 105 in which time slots 2, 3 and 7 are free of any calls; they can be allocated the three frequencies f1, f2 and f3, resulting in the arrangement 106; all the time slots can now use the three frequencies f1, f2 and f3.

Note that in this method a single mobile (M42) has been moved twice.

Obviously, if a time slot were entirely free, it would not have been necessary to move the same mobile twice: the method would begin at 102 and end at 106 without ever moving the same mobile twice.

Note also that if more than one time slot were free it would have been possible to free several time slots in parallel, so reducing the total duration of the procedure.

Figure 4A:
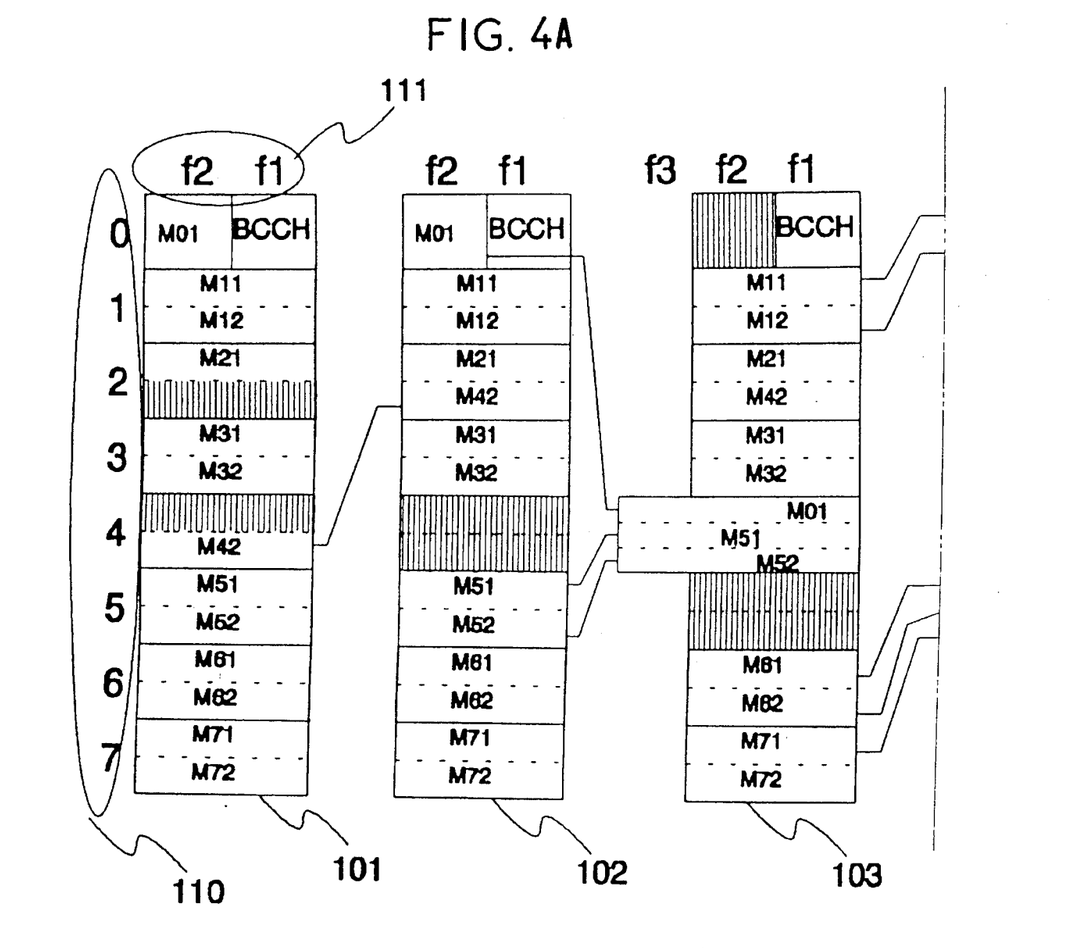
FIGS. 4A and 4B show a second method of carrying out frequency redefinition in accordance with the invention.
Figure 4B:
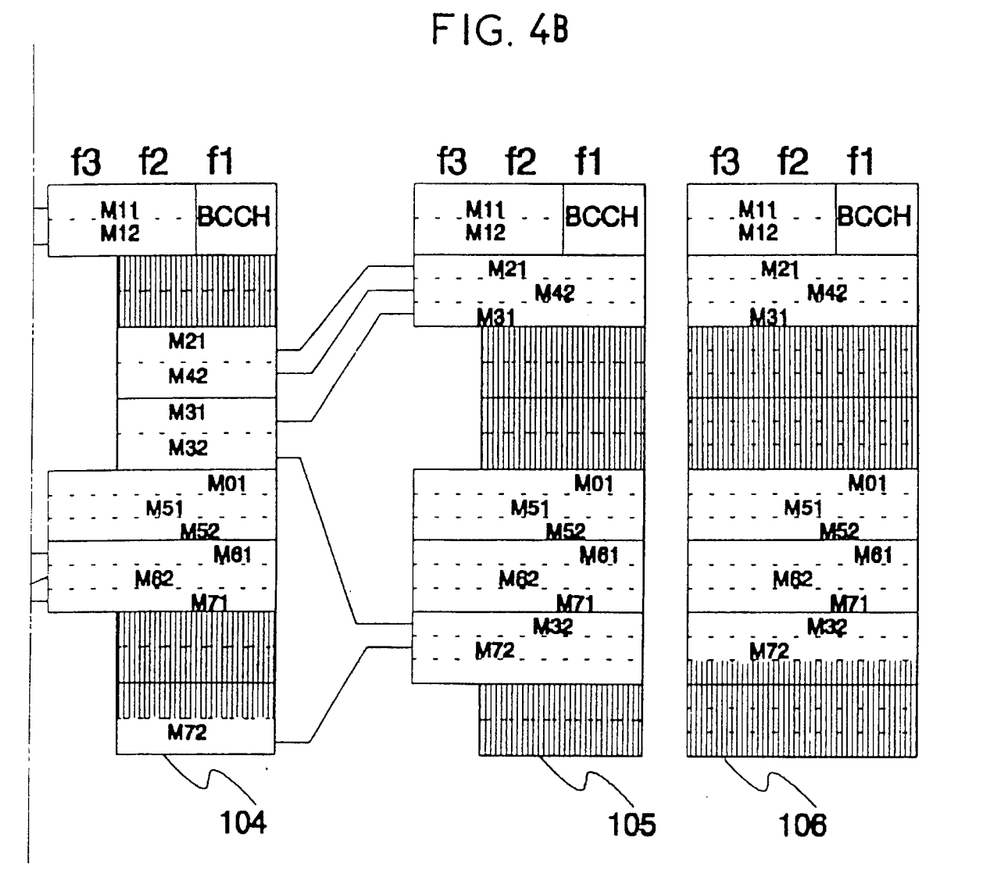

FIG. 4 shows a second method of implementing the invention to add a frequency, which method is usable even when all the traffic channels are busy, at the start of the procedure.

At step 201 the cell is using the set of frequencies 111 and 15 mobiles are using all the traffic capacity of the cell.

Unlike the previous example, it is not possible to free a time slot by assigning an existing channel to a mobile, as all channels are busied.

To solve this problem the frequency f3 is used in isolation in advance on the time slots:

mobile M01 is moved to time slot 1 at frequency f3,
mobile M61 is moved to time slot 2 at frequency f3,
mobile M62 is moved to time slot 3 at frequency f3,
mobile M71 is moved to time slot 4 at frequency f3,
mobile M72 is moved to time slot 5 at frequency f3.

This produces the arrangement 202 in which it is possible to redefine the sets of frequencies for time slots 6, 7 and 0 by systematically adding the frequency f3 to them.

The method of the first example can then be applied without specific problems to yield the arrangement 206, through the intermediate stages 203, 204 and 205.

In this example, as in the previous example, it is possible for one of the time slots to be used to manage SDCCH channels: instead of a single mobile per channel, there can be eight mobiles managed by eight logical subchannels corresponding to a time arrangement such that each mobile can send and receive in turn using the same time slot. In this case eight assignments are required to move the mobiles from one time slot to another.

The same problem exists if communication with mobiles is in half-bit-rate mode: as two mobiles share the same channel in this case, two assignment procedures are required to free a channel.

Removing a frequency is the converse operation to adding a frequency. It is explained with reference to FIG. 1, in order to show the similarities with the process for adding a frequency.

It is assumed that the number of channels available after frequency redefinition is sufficient for all the mobiles present prior to the start of frequency redefinition.

Time slots 2, 3 and 7 are free at 106. If they were not, the procedure as described for the change from 101 to 102 could be applied to free at least one of them.

The frequency f3 is removed from these three time slots, after which the mobiles are moved to the redefined time slots. Reading FIG. 1 in reverse, from 106 through 101, a simple mode of achieving this operation is obtained. Note that the process is not exactly symmetrical, as another mobile should have been moved to time slot 7 at the time of the change from 105 to 104: at each step a maximum number of mobiles must always be moved to time slots already redefined.

There is claimed:

1. A frequency redefinition method for a cellular mobile radio system with mobiles moving in a geographical network of cells, wherein communication with a mobile is established on an available communication channel in a cell in which said mobile is located, wherein calls are conveyed in a time-division multiplex whose successive frames are formed of time slots each containing at least one communication channel, each call being routed in segments in the same time slot on a plurality of multiplex flames, and wherein each communication channel is further defined by a list of frequencies usable for said communication, said list of frequencies being redefinable, under the control of a mobile radio network management module, in order to replace a first list of N frequencies with a second list of M frequencies, where M can be equal to or different from N;

said method comprising the steps of effecting replacement of the first list of frequencies by the second list time slot by time slot, freeing each time slot step by step by eliminating all calls in said each time slot, then effecting frequency redefinition of said freed time slot by assigning it said second list of M frequencies, and, finally, making said time slot available again for traffic.

2. The method according to claim 1, wherein, if the second list of frequencies comprises at least as many frequencies as the first, said method further comprises effecting replacement of the first list of frequencies by the second list time slot by time slot, by using the following steps:

freeing at least a first time slot by eliminating any call in said time slot;

effecting frequency redefinition of said first time slot freed by assigning it said second list of M frequencies, after which said first time slot is made available for traffic again;

freeing a second time slot by transferring calls from said second time slot to said first time slot;

effecting frequency redefinition of said second time slot freed by assigning it said second list of M frequencies after which said second time slot freed is made available for traffic again; and continuing call transfer, time slot by time slot, in an iterative manner until frequency redefinition of all time slots of the communication channel is achieved.

3. The method according to claim 1 wherein a first time slot freed is that which is freed naturally first.

4. The method according to claim 1 wherein the step of freeing each time slot comprises at least one step from the following steps:

intracellularly reassigning at least one call from said each time slot to another time slot of the multiplex frames;

intracellularly reassigning at least one call from said each time slot to a communication channel of another network cell; and forcing interruption of at least one call of said each time slot.

5. The method according to claim 1 wherein the step of freeing each time slot comprises at least one step from the following steps:

waiting for natural freeing of at least one call in said time slot, and prohibiting assignment of a new call in said time slot.

6. The method according to claim 1 wherein the stage in which each time slot is freed comprises:

waiting a predetermined time for natural freeing of at least one time slot;

failing natural freeing during said predetermined time, forced freeing according to one of the following procedures:

intracellularly reassigning at least one call from said each time slot to another time slot of the multiplex frames;

intracellularly reassigning at least one call from said each time slot to a communication channel of another network cell; and forcing interruption of at least one call of said each time slot.

7. The method according to claim 1, wherein, if the second list of frequencies comprises a greater number of frequencies than the first list, so that additional communication channels are created, said method further comprises freeing at least one time slot by transferring calls from said time slot to be freed to said additional communication channels.

8. The method according claim 1, wherein, if the frequency redefinition entails changing at least one frequency from the list of frequencies, the frequency change having to be effected simultaneously in all time slots, said method further comprises using the steps according to claim 1 twice in succession:

a first time to free in each time slot the frequency to be replaced, in order to eliminate it; and a second time in order to introduce a new frequency to replace the eliminated frequency.

9. The method according to claim 1, wherein, if a frequency redefinition occurs when a transfer from transfers to another cell and first access requests is in progress, said method further comprises regarding a respective channel, associated with the list of frequencies to be replaced, as freed only after successful transfer is confirmed.

10. The method according to claim 9, further comprising regarding the channel occupied by said mobile, and associated with the old list of frequencies to be replaced, as freed only after a predetermined time-delay.

11. The method according to claim 1, wherein, if a transfer of transfers of a mobile from another cell and first access requests occurs at the same time as frequency redefinition, said method further comprises preferably establishing the call on a time slot already associated with the newly defined frequencies.

12. The method according to claim 1, wherein, if the frequency redefinition concerns a frame comprising a specific time slot including a communication channel using a control frequency not affected by the frequency redefinition, said method further comprises freeing said specific time slot as the first time slot freed.

\* \* \* \* \*